United States Patent [19]

Bennett et al.

[11] 4,115,269
[45] Sep. 19, 1978

[54] RANDOM PACKING MATERIALS

[75] Inventors: John Reginald Bennett, Lingfield; Kent R. Greer, Marple Bridge, both of England

[73] Assignee: Acalor International Ltd., Sussex, England

[21] Appl. No.: 786,671

[22] Filed: Apr. 11, 1977

[30] Foreign Application Priority Data

Apr. 15, 1976 [GB] United Kingdom ............... 15758/76

[51] Int. Cl.² ................................................ C02C 1/04
[52] U.S. Cl. .................................... 210/150; 261/94; 261/DIG. 72
[58] Field of Search ............. 261/94, DIG. 72, 95–99; 210/17, 150, 151

[56] References Cited

U.S. PATENT DOCUMENTS

| 2,212,932 | 8/1940 | Fairlie | 261/DIG. 72 |
| 3,957,931 | 5/1976 | Ellis et al. | 261/DIG. 72 |

Primary Examiner—Thomas G. Wyse
Attorney, Agent, or Firm—Wenderoth, Lind & Ponack

[57] ABSTRACT

A bed for the treatment of fluids comprising a plurality of packing units. Each packing unit has a plurality of fins disposed around an axis lying substantially in the plane of each of the fins. The fins are held in a spaced relationship to one another by at least one generally annular reinforcing member between each angularly adjacent pair of fins in a plane substantially perpendicular to the axis. The outward facing edges of the fins are serrated.

13 Claims, 7 Drawing Figures

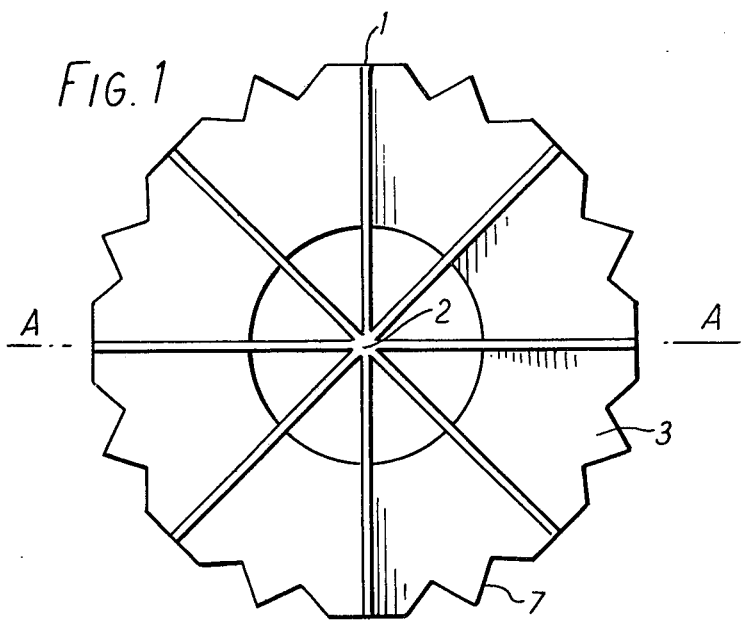
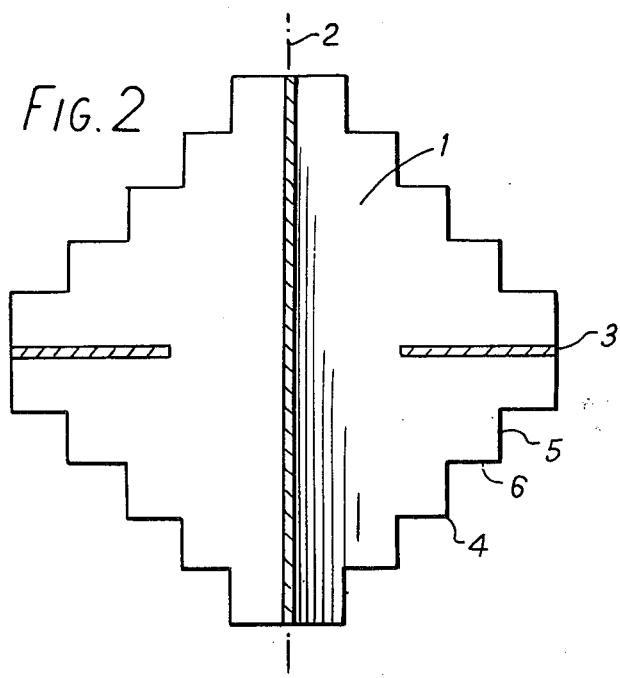

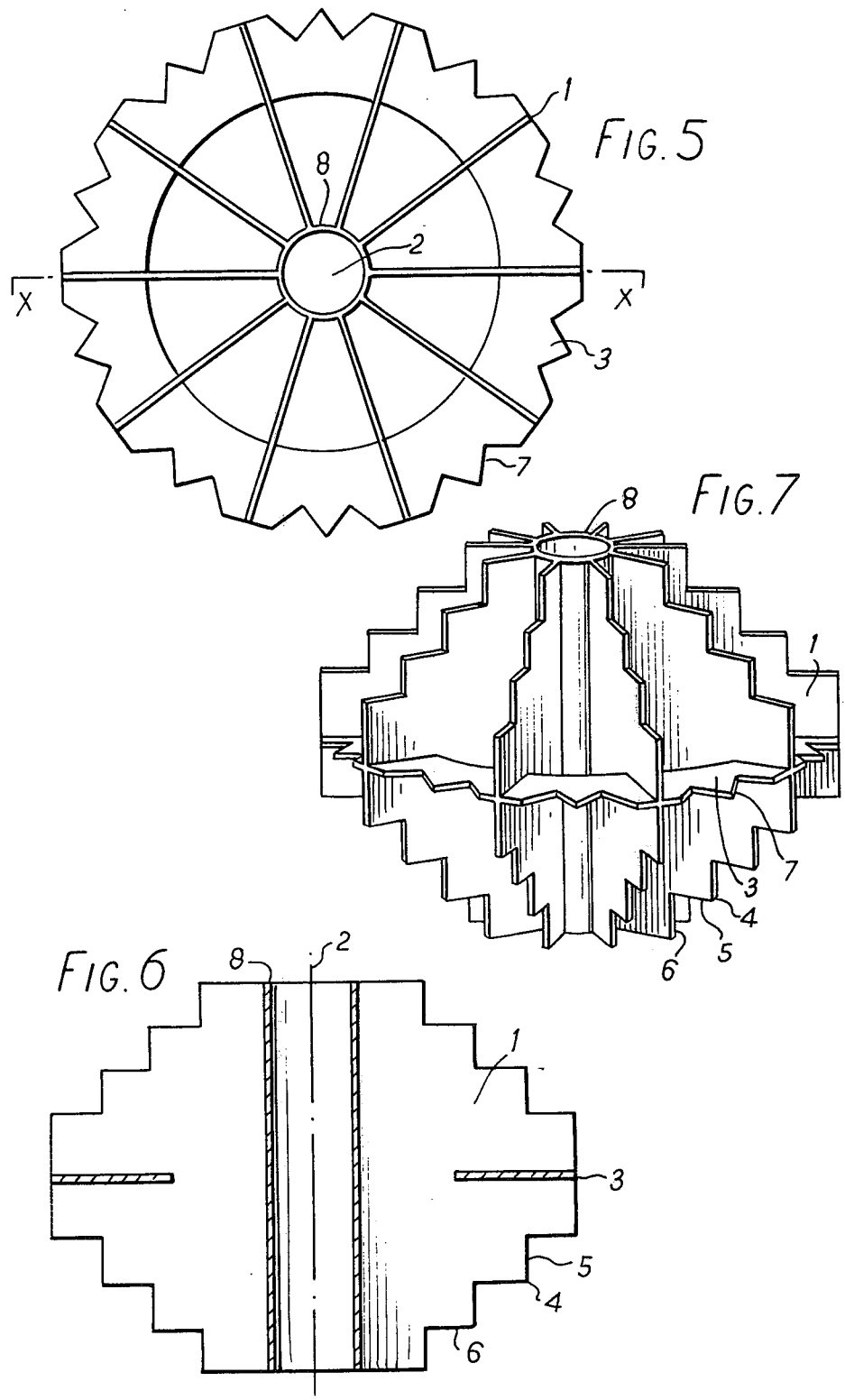

RANDOM PACKING MATERIALS

The present invention relates to random packing material for use in percolating or trickling filters, gas washing or absorption towers and related systems requiring fluid-fluid (e.g. gas-liquid, gas-gas) contact. In particular the invention relates to random packing material intended for use primarily as a filter medium in a filter bed used for the biological treatment of effluent or sewage.

Basically, fluid-fluid contact apparatus comprises a tower or other structure containing one or more beds of packing elements and having means for introducing the fluids to be brought into contact with each other into said bed. In many applications, the fluids are brought into contact in countercurrent flow, the more dense fluid (i.e. the liquid in the case of gas (vapour)/liquid contact apparatus) flowing downwardly through the packed bed whilst the less dense fluid (i.e. the gas or vapour in the gas of gas (vapour)/liquid contact apparatus) flows upwardly through the bed. In other applications (e.g. cross-flow cooling towers) the fluids flows are generally at right angles to each other, for example with a liquid flowing downwardly through the bed whilst a gas or vapour flows across the bed. It is not that necessary that both fluids be forcibly fed to the bed and thus, for example, in the case of a so-called sewage filtration bed, liquid effluent is irrigated onto the surface of a packed bed through which air is allowed to permeate (usually without forced flow) to permit aerobic biological treatment of the effluent.

A wide variety of packing elements are known for such apparatus, for example, manufactured packings such as Raschig rings, Berl saddles, Intalox saddles and Pall rings. In the case of packing elements such as Raschig rings or Pall rings the beds may be stacked beds, (i.e. beds in which the elements are individually placed in position) or dumped beds (i.e. beds in which at least a portion of the elements have been dumped in situ in the apparatus). In the case of the saddles the beds will almost always be "dumped" beds.

The nature of the packing will of course affect the performance of the apparatus and it is an object ot this invention to provide fluid-fluid contact apparatus packed with packing elements leading to improved liquid/liquid or gas, (vapour)/liquid contact with the apparatus.

In systems requiring fluid-fluid contact it is desirable that the packing materials used fulfil certain criteria and the more fully these criteria are met the better will be the resultant treating system. In the case of random packing materials for use in fluid-fluid systems the criteria may be divided into those required of the individual units and those required of the units when combined to give the packing.

The requirements of the individual unit are:
(i) It should have a high surface area/voidage ratio.
(ii) It should be rigid and self supporting.
(iii) It should have natural wetting properties and be capable of accepting a wide range of hydraulic loadings.
(iv) It should be light in weight to minimise the requirement for foundations.

When the units are packed into a tower or filter the packing is required to:
(i) be capable of sustaining the necessary weight at an operational packed height or depth.
(ii) be capable of providing a surface suitable for biological growth.
(iii) give an even distribution of liquid at an optimum liquid residence time for treatment of the liquid to be effective.
(iv) have good self-distributing properties.
(v) provide adequate voidage for natural aeration/oxygen transfer and the natural removal of solids by passage of liquids through the bed.
(vi) minimise small apertures such as might be unable to pass solids.
(vii) minimize troughs and cavities where liquid might be retained.

The random packing unit of the present invention has been designed so as to include the above mentioned features and to produce a random packing unit having improved performance characteristics over hitherto known materials.

The present invention provides a bed for the treatment of fluids comprising a plurality of packing units characterised in that a packing unit has a plurality of fins angularly disposed around an axis lying substantially in the plane of each of the fins, and at least one generally part annular reinforcing member between each angularly adjacent pair of fins in a plane substantially perpendicular to the axis, holding said fins in spaced relationship to one another, the outward facing edges of the fins being serrated.

The fins of the packing unit maybe in contact with each other at the axis about which they are angularly disposed. However, it is preferred that the unit be provided with a hollow tube the longitudinal axis of which is substantially co-incident with the axis about which the fins are disposed, the fins fadiating from the outer surface of the tube.

The fins may be of any suitable shape, for example triangular or semicircular or a variation between these two extremes and they may further be flat or corrugated. In the case where no central tube is present, co-planar fins may be paired so as to comprise circular, square, rhomboidal, quadrilateral etc. members symmetrical about the axis.

The size of the individual fins of each packing unit may vary but it is preferred that the fins be essentially identical in size and shape, and further that the fins are symmetrical i.e. semicircles or isoceles or equilateral triangles.

The number of fins may vary but there are at least three and generally not more than twelve. The number of fins is controlled by the conflicting requirements of a high surface area/volume ratio, and the need to avoid apertures which might become blocked in use.

The shape size and number of reinforcing members may vary but it is preferred that the number of reinforcing members between each pair of angularly adjacent fins be the same, and that if the number of fins is X there are $nX$ reinforcing members, where $n$ is an integer from 1 to 3. It is further preferred that the reinforcing members be in $n$ parallel planes and that the reinforcing members in each plane be symmetrical and essentially identical in size, thus forming generally annular reinforcing plates.

The size of the packing unit will depend on the use to which it is to be put, in accordance with known criteria. The axial length of the unit may suitably be from 3 to 18 cms. The distance from the axis to the furthest point of each fin may suitably be from 1.5 to 9 cm.

It is preferable that the overall axial length is approximately double or rather less than double the distance from the central axis to the extremity of the fins.

In the preferred case where a tube is present, the ratio of the overall diameter of the packing unit to the internal diameter of the tube is from 4:1 to 8:1 preferably 6:1 to 7:1. The wall of the tube is of substantially the same as or thicker than the thickness of the fins.

When they are present, the number of generally annular reinforcing plates may also vary although a single reinforcing plate is preferred. The hole in the generally annular reinforcing plate may be of any suitable geometry although a circular hole of diameter ¼ to ½ the largest dimension of the plate is preferred.

The reinforcing member is also preferably serrated at its outer edges. The Shape, depth and number of serrations per unit length may vary, but serrations in the outer edges of the fins which have edges parallel to the central axis and the reinforcing shaped member are preferred. It is preferable that there are 2 to 6 e.g. 4 serrations per 5 cm of outer edge. Similar considerations apply to the serrations on the outer edges of the reinforcing member.

The incorporation of serrations as a feature of the random packing unit is advantageous in that it causes the units to lock together and thereby impart stability to the packing when installed in a filter bed. The serrations also serve to distribute the load of the bed through a series of planes.

The random distribution of the elements placed in a filter bed or tower ensures even distribution of the liquid as it falls down the bed or tower and eliminates the need for complicated liquid distribution systems which have been hitherto necessary if even distribution is to be achieved. The configuration of each element ensures that no channelling of the liquid occurs. Each element is mechanically strong and therefore there is no tendency for the packing to collapse under conditions of load when it has to support an accumulation of biological material. Also, with packings in accordance with the invention, there is no necessity for any intermediate supporting structure such as beams or ribs, although such supporting structure may, of course, be used if desired.

The packing unit may be manufactured from any suitable material but it is preferred that plastics materials such as polystyrene, polyvinyl chloride and polypropylene be used. The units may be made for example by injection moulding, extrusion or vacuum forming, the method chosen depending upon the particular manufacturing requirements.

Possible applications of the invention are:
1. As a filter medium in effluent or sewage treatment to replace stone in filter beds.
2. As a filter medium stacked into a tower for biological treatment of effluents.
3. As a packing for gas washing, scrubbing or chemical change by absorbtion.
4. As a medium for forced draught cooling in cooling towers.

Preferred embodiments of the invention will now be described with reference to the accompanying figures.

FIG. 1 is a plan view of a packing unit.

FIGS. 2 and 3 are sections on the line A—A of FIG. 1 showing alternative geometries of pairs of coplanar fins.

FIG. 5 is a plan view of a second packing unit of the invention.

FIG. 6 is a section of the line X—X of FIG. 5.

FIG. 7 is a perspective view of the packing unit of FIGS. 5 and 6.

Figure 3:
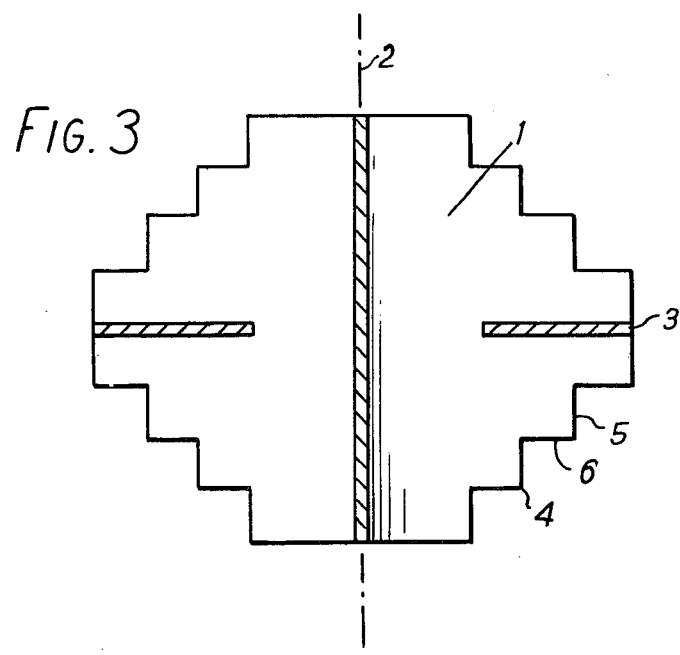
Figure 4:
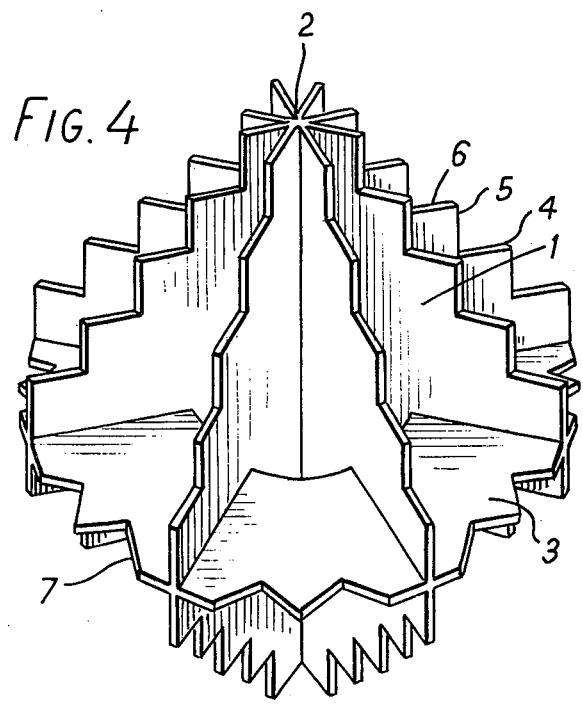
FIG. 4 is a perspective view of the packing unit of FIGS. 1 and 2.

The packing unit illustrated in FIGS. 1 to 4 comprises eight fins 1 angularly disposed about an axis 2 lying in the plane of each fin; and an annular reinforcing member 3 in a plane perpendicular to the axis, holding the fins 1 in spaced relationship to one-another. The outward facing edges of the fins 1 are serrated at 4, the serration comprising alternating edges 5, parallel to the axis 2, and 6, parallel to the reinforcing member 3, there being about 4 serration per 5 cm. The axial length of the unit is either 7 or 9 cm and the radial length of each fin is 4.5 cm.

The reinforcing member 3 is a generally annular plate with an outer diameter of 9 cm and an inner diameter of 4 cm. The outer edge is serrated at 7, the serrations being similar to those on the fins 1.

The unit shown in FIG. 3 occupies a smaller volume in a random packed bed than does the unit shown in FIG. 2, without having a significantly reduced usable surface area. It is preferred that the fins be truncated, perpendicular to the axis of the unit, in the manner shown in FIG. 3.

The packing unit shown in FIGS. 5 to 7 comprises 10 fins 1 angularly disposed about an axis 2 lying in the plane of each fin, the fins radiating from a tube 8 having its longitudial axis co-axial with the axis (2) about which the fins 1 are disposed; and an annular reinforcing member 3 in a plane perpendicular to the axis (2), holding the fins 1 in a spaced relationship to one another. The outward facing edges of the fins 1 are serrated at 4, the serration comprising alternative edges 5 parallel to the axis 2, and 6, parallel to the reinforcing member 3, here being about 4 serrations per 5 cm. The axial length of the unit is 7 cm, the radial length of each fin is 4 cm and the internal diameter of the tube is 1.5 cm.

The reinforcing member 3 is a generally annular plate with an outer diameter of 9.8 cm and an inner diameter of 6.7 cm. The outer edge is serrated at 7, the serrations being similar to those on the fins 1.

The units illustrated are approximately octahedral in shape comprising either 16 to 20 triangular faces each defined by serrated edges of two fins and the reinforcing member. The serrations are designed so that the units shall pack randomly into a bed for fluid treatment without stacking together. The central tube provided in the embodiment of FIGS. 5 to 7 is designed to permit a better flow of liquid whilst reducing blocking.

What we claim is:

1. A bed for the treatment of fluids comprising a plurality of packing units characterized in that each packing unit consists essentially of a plurality of fins disposed around an axis lying substantially in the plane of each of the fins, and at least one generally part annular reinforcing member between each angularly adjacent pair of fins in a plane substantially perpendicular to the axis, holding said fins in spaced relationship to one another, the outward-facing edges of the fins being serrated, the packing units being so shaped that they take up a random configuration in the bed, with contact between adjacent units being predominantly along the edges of the fins and the reinforcing members, whereby fluid applied to the bed is distributed substantially evenly therethrough.

2. A bed as claimed in claim 1, wherein the packing unit has from 3 to 12 fins.

3. A bed as claimed in claim 1, wherein the part angular reinforcing members together form one or more generally angular plates.

4. A bed as claimed in claim 1, wherein the outer edges of the reinforcing members of each packing unit are serrated.

5. A bed as claimed in claim 1, wherein the axial length of each unit is from 3 to 18 cms.

6. A bed as claimed in claim 1, wherein there is one reinforcing member between each adjacent pair of fins, all the reinforcing members being in the same plane and forming a generally annualr reinforcing plate.

7. A bed for the treatment of fluids comprising a plurality of packing units characterized in that each packing unit consists essentially of a hollow tube having a longitudinal axis, a plurality of fins radiating from the outer surface of the tube substantially in the same plane as the axis of the tube, and at least one generally part annular reinforcing member between each angularly adjacent pair of fins in a plane substantially perpendicular to the axis of the tube, holding said fins in spaced relationship to one another, the outward-facing edges of the fins being serrated, the packing units being so shaped that they take up a random configuration in the bed, with contact between adjacent units being predominantly along the edges of the fins and the reinforcing members, whereby fluid applied to the bed is distributed substantially evenly therethrough.

8. A bed as claimed in claim 7, wherein the ratio of the diameter of the packing unit to the diameter of the tube is from 4:1 to 8:1.

9. A bed as claimed in claim 7, wherein the packing unit has from 3 to 12 fins.

10. A bed as claimed in claim 7, wherein the part angular reinforcing members together form one or more generally annular plates.

11. A bed as claimed in claim 7, wherein the outer edges of the reinforcing members of each packing unit are serrated.

12. A bed as claimed in claim 7, wherein the axial length of each unit is from 3 to 18 cms.

13. A bed as claimed in claim 7, wherein there is one reinforcing member between each adjacent pair of fins, all the reinforcing members being in the same plane and forming a generally annular reinforcing plate.

* * * * *